July 13, 1926.

F. S. RIPPINGILLE 1,592,707

LIQUID METER

Filed Dec. 15, 1925     2 Sheets-Sheet 2

Inventor
Frank S. Rippingille
By
James L. Norris
Attorney

Patented July 13, 1926.

1,592,707

UNITED STATES PATENT OFFICE.

FRANK SIDEBOTHAM RIPPINGILLE, OF BIRMINGHAM, ENGLAND.

LIQUID METER.

Application filed December 15, 1925, Serial No. 75,636, and in Great Britain November 24, 1924.

This invention relates to liquid meters generally, but particularly for use on motor vehicles for the purpose of indicating the total volume of liquid fuel consumed during a given period of time, or for a given journey or distance travelled, such meters being of that type in which the liquid or fuel passes into a chamber or vessel containing a float which rises and falls with the level of the liquid and automatically operates inlet and outlet valves, the movement of the float actuating suitable counter or other mechanism which gives an indication of the amount of liquid which has passed through the chamber during a given period, or for a given distance. An object of the present invention is to provide an improved and simplified construction of liquid meter of this type.

The invention consists essentially in arranging both the inlet and outlet valves and their actuating mechanism below the float and at the bottom of the measuring chamber, the said valves both being actuated through the medium of a member operated by the movement of the float. The valve operating mechanism may be arranged upon the base of the measuring chamber so as to lie clear of the float, this arrangement preventing a large quantity of motor fuel from remaining in the bottom of the chamber when the outlet valve closes. A second chamber of known form is also preferably arranged beneath the float or measuring chamber and into which the fuel passes from the float or measuring chamber before reaching the carbureter, this second chamber being adapted to hold a reserve supply of fuel, and serving to prevent interruption of the flow of fuel supply to the carbureter when the outlet valve is closed and the float or measuring chamber is being refilled. The quantity of fuel passing through the latter may be indicated by suitable counter-mechanism operated by a weighted lever controlled by the float, whilst the float may, in addition, also actuate a pointer adapted to indicate the fuel consumption in terms of miles per gallon.

Figure 1:
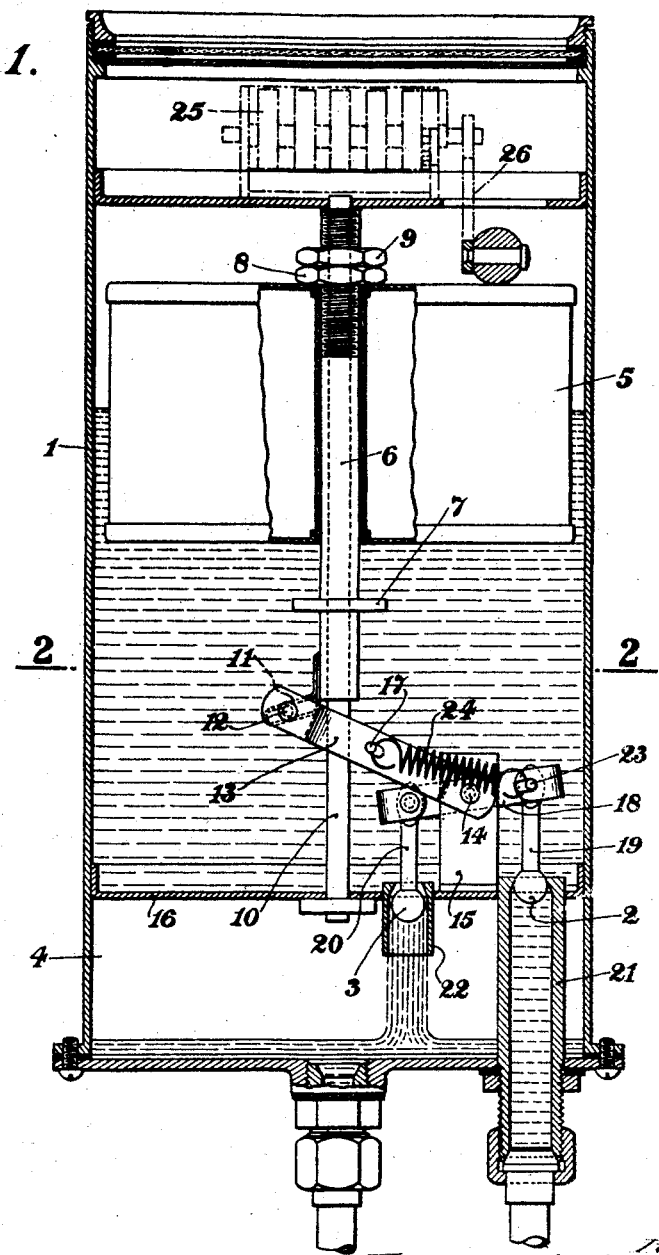

Figure 1 of the accompanying drawings is a vertical section through a meter for indicating the total fuel consumption of a motor vehicle during a given time or over a given distance or journey, the inlet valve being shown closed and the outlet valve open.

Figure 2:
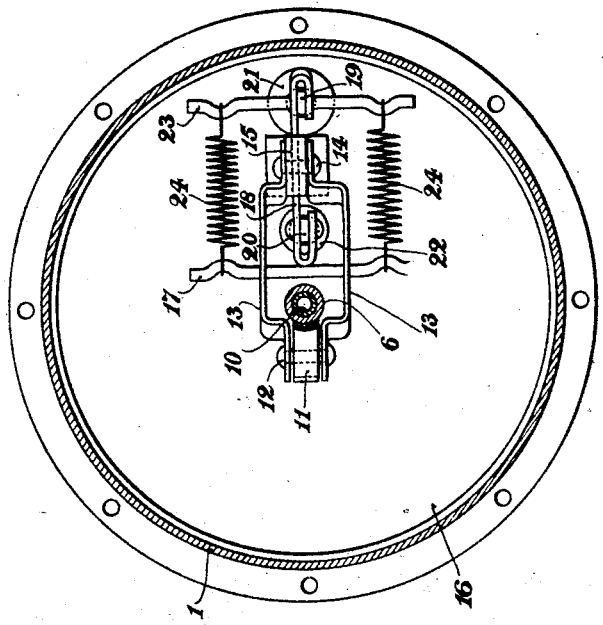

Figure 2 is a horizontal section on line 2—2, Figure 1, showing the valve mechanism in plan.

The improved device comprises a cylindrical measuring chamber 1 through which the fuel passes before reaching the carbureter, an inlet valve 2 and an outlet valve 3 being provided at the bottom of the said chamber, which said valves are adapted to be alternately opened and closed to permit the chamber to be successively emptied and refilled, the fuel passing through the outlet valve from the measuring chamber 1 into a lower compartment or chamber 4 which is in direct communication with the carbureter. This lower chamber 4 serves to contain a reserve supply of fuel, and prevents the interruption of the fuel supply to the carbureter while the outlet valve is closed and the said upper or measuring chamber 1 is being refilled. Both the inlet and outlet valves 2, 3, are actuated through the medium of a float 5 contained within the upper chamber and which is adapted to rise and fall with the level of the fuel in the latter. For this purpose, the float is mounted to slide freely upon a sleeve 6 so that it can rise and fall between a lower stop collar 7 and an upper stop collar on the sleeve 6, the latter preferably being in the form of nuts 8, 9, adjustable upon the screw-threaded upper end of the sleeve, so that the height to which the float rises before it engages this stop may be varied. The sleeve 6 slides freely upon a central fixed rod 10 and at its lower end carries a laterally-projecting loop or slotted spur 11 engaged by a pin 12 carried by a lever 13 pivoted at 14 upon an upstanding bracket 15 fixed on the base 16 of the chamber 1. The lever or arm 13 is composed of two side plates on opposite sides of the rod 10 and held together at one end by the pin 12 and between their ends by another transverse pin 17. The opposite ends of these side plates are bent toward one another to engage the outer sides of the bracket 15. The bracket 15 is of U-form, and pivoted between the sides or branches thereof, upon the pin 14, is a double-armed lever 18 to the opposite extremities of which are respectively connected the stems 19 and 20 of the inlet and outlet valves 2 and 3, respectively. The valves 2 and 3 are disposed within suitable housings 21, 22, so that they engage, when raised, against downwardly flared seats at the upper ends of the housings. Passing through the one end of the valve-carrying lever 18 is a transverse pin 23 to the extremities of which are attached coiled tension springs 24, 24, the opposite ends of the latter being connected to the respective ends of the pin 17 which pass through the sides of the actuating arm 13.

The operation of the meter is as follows:—

When the inlet valve 2 is open, motor fuel enters the chamber 1 and, as the latter fills, the float 5 rises until it engages the stop nuts 8, 9, when it lifts the sleeve 6. This causes the slotted spur 11 to engage the pin 12 and raise the lever 13, and moves the springs 24 into such a position relative to the centre 14 of the lever 18, as to cause them to move that end of the lever 18 which carries the valve stem 19 upwardly and so close the inlet valve 2 and open the outlet valve 3 with a snap action, the parts taking the position shown in Figure 1. The motor fuel is thus discharged from the measuring chamber 1 through the valve 3 into the lower chamber 4, from which it passes to the carbureter. As the float 5 falls it engages the lower stop collar 7 on the sleeve 6, which is thereby lowered, and moves the lever 13 downwardly, so causing the springs 24 to move below the centre 14 of the lever 18, and thereby close the outlet valve 3 and open the inlet valve 2 with a snap action.

In order to indicate the quantity of fuel which passes through the float chamber, suitable counter-mechanism 25 is employed which may be secured to the upper end or front of the meter so as to be visible through an opening therein, the said mechanism being actuated by the rising of the float. For this purpose, the counter-mechanism is operated by a weighted arm 26, the outer weighted end of which may carry a roller or wheel resting upon the float 5, so that the arm is moved upwardly to actuate the counter-mechanism when the float rises. The arm 26 is adapted, when the float 5 falls, to move freely downward, without actuating the counter-mechanism.

Having fully described my invention, what I desire to claim and secure by Letters Patent is:—

1. A liquid fuel meter for motor vehicles comprising a measuring chamber, an auxiliary fuel compartment below said chamber, said measuring chamber having in its bottom an outlet communicating with said auxiliary fuel compartment and a fuel inlet, a member vertically movable in said measuring chamber having upper and lower stops, guiding means for said vertically movable member, a float slidable on said vertically movable member and adapted to engage, in its rise and fall, with said upper and lower stops, respectively, an indicator, means actuated by the float in its rising and falling movements for operating said indicator, a lever fulcrumed intermediate its ends, a valve carried by one end of said lever for closing said outlet, a valve carried by the other end of said lever for closing said inlet, a second lever fulcrumed coaxially with said first-named lever and having one end connected to said vertically movable member, and a spring having its ends connected, respectively, with said first and second levers on opposite sides of said fulcrum.

2. A liquid fuel meter according to claim 1 wherein the inlet and outlet have downwardly flaring valve seats and the valves for closing said inlet and outlet carried by the first-named lever engage said seats when the ends of said lever are, respectively, in their raised positions.

3. A liquid fuel meter according to claim 1 wherein the upper end of the vertically movable member is externally screw-threaded and the upper stop comprises a nut and a lock nut mounted on said end whereby said stop may be vertically adjusted on said member.

4. A liquid fuel meter comprising a measuring chamber, an auxiliary fuel compartment below said chamber, said measuring chamber having in its bottom an outlet communicating with said auxiliary fuel compartment and an inlet, a float in said measuring chamber, indicating means actuated by the float in its rising and falling movement, guiding means for said float including a vertically movable member, upper and lower stop means associated with said vertically movable member and engaged, respectively, by said float in its rise and fall, said vertically movable member having a laterally extending and longitudinally slotted spur, a forked member extending upwardly from the bottom of said measuring chamber, a lever composed of a pair of plates, one on each side of said forked member, a pin connecting said plates together at one of their ends and engaging the slot of said spur, a second lever, a pin extending through said plates, said fork and said last-named lever intermediate the ends of the latter and serving as a fulcrum for said levers, valves for closing said outlet and inlet carried, respectively, by the opposite ends of said second lever, and a spring having its ends connected, respectively, with said first and second levers on opposite sides of said fulcrum.

In testimony whereof I have hereunto set my hand.

FRANK SIDEBOTHAM RIPPINGILLE.